Nov. 10, 1931.　　　M. A. MYERS　　　1,831,315
CORRECTION TABLE FOR THERMOHYDROMETERS
Filed March 22, 1929
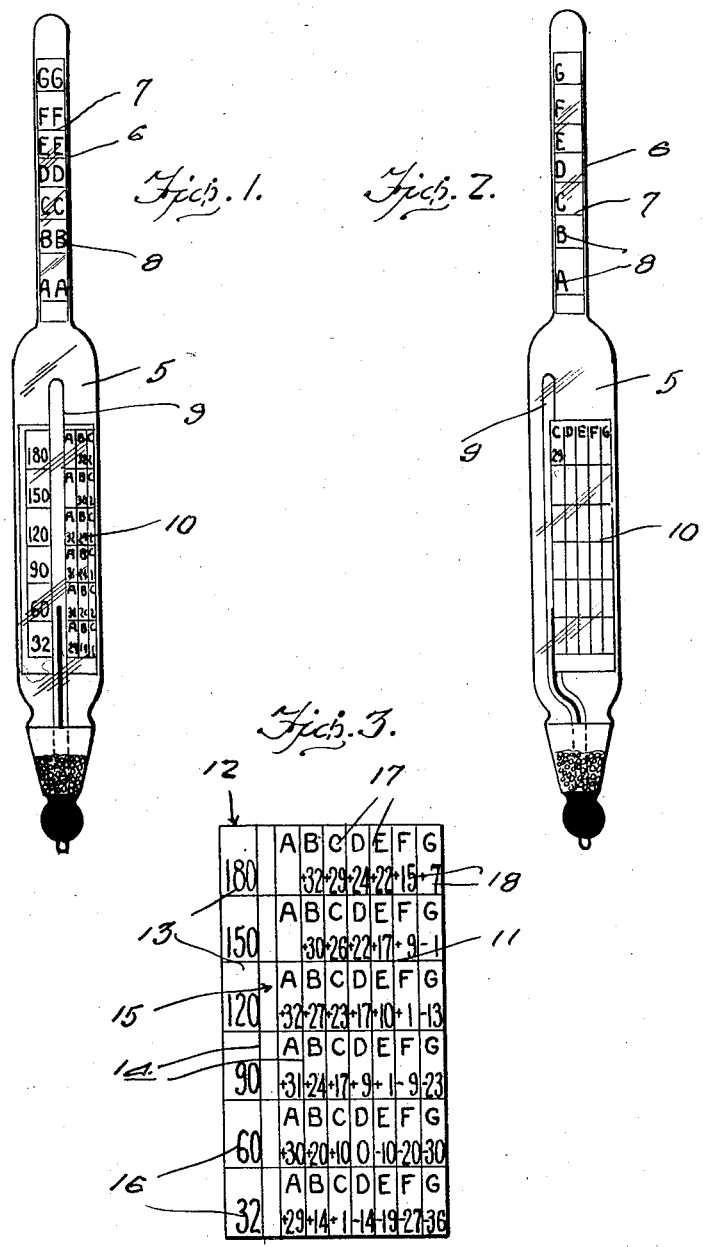
Inventor
M. A. Myers
By Clarence A. O'Brien
Attorney Patented Nov. 10, 1931

1,831,315

UNITED STATES PATENT OFFICE

MAX A. MYERS, OF SCRANTON, PENNSYLVANIA, ASSIGNOR TO SCRANTON GLASS INSTRUMENT COMPANY, A CORPORATION OF DELAWARE

CORRECTION TABLE FOR THERMOHYDROMETERS

Application filed March 22, 1929. Serial No. 349,029.

The present invention relates to a device for use in testing any solution of a particular substance where a change in temperature will materially change the specific gravity, and a primary object of the invention is to provide a device of this character which will indicate not only the hydrometer or specific gravity reading, but also the temperature of the tested solution and at the same time furnish a correction table whereby the freezing point of the solution may be determined, thus especially rendering the device useful in testing such solutions having a variant specific gravity caused by the change in temperature of the tested solution.

A still further object of the invention is to provide a device of this character which will be found especially adapted for use to determine the freezing point of such "anti-freeze" solutions as are used in automobile radiators during the winter months.

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

Figure 1 is a front elevational view of a hydrometer float showing the relative position of the correction table with respect to the thermometer within the float.

Figure 2 is a side elevational view thereof and

Figure 3 is a plan view of the sheet upon which the correction table is placed.

Referring now to the drawings in detail, wherein for the purpose of illustration I have disclosed a preferred embodiment of the invention, the numeral 5 designates generally a hydrometer float of usual construction and formed with a reduced stem 6 at its upper portion. A hydrometer reading scale 7 is placed within the stem 6, which may be of any suitable type, the present embodiment of the scale consisting of a plurality of vertical rows of letters 8 printed upon a sheet of paper and rolled for placing within the stem. The different letters of the scale indicate the specific gravity of the solution being tested by the position at which the level of the solution occurs with respect to the letters or other indicating indicia carried by the stem.

The thermometer is disposed within the lower portion of the float and extends upwardly from the bottom thereof, the thermometer preferably being disposed in spaced relation from the walls of the float and offset from the longitudinal center thereof and in a direction toward the front side of the float, as clearly illustrated in Figure 2 of the drawings.

A correction table indicated generally at 10, is associated with the thermometer and preferably comprises a sheet of flexible paper 12 ruled to form horizontal and vertical columns 16 and 14 respectively. The sheet 12 is also rolled for positioning within the float in the same manner as the hydrometer scale 6 and one of the vertical columns of the correction table, indicated at 15, is left blank and is positioned immediately rearwardly of the thermometer 9, said column being hidden from view by the thermometer, as will be seen from an inspection of Figure 1 of the drawings. The vertical column immediately adjacent and to the left of the blank column 15 is provided with a thermometer reading scale 16 which graduates upwardly, in Fahrenheit figures, the lowermost figure designating a freezing temperature.

The remaining vertical columns, at the opposite side of the thermometer, are equal in number to the number of letters composing the hydrometer scale 6, and the upper portion of each of the horizontal columns of the sheet 12 are provided with the letters or other indicia, corresponding to the letters or indicia 8 of the hydrometer scale, as shown at 17 and reading in a direction away from the blank vertical column 15.

The lower portion of each of the horizontal columns of the sheets are provided with figures 18 disposed in a horizontal plane with its respective Fahrenheit figure 16 and graduated oppositely from the letters 17.

In the operation of the device, the hydrometer float will indicate the specific gravity of the solution being tested, in accordance with the position of the fluid with respect to the hydrometer scale 6 and the thermometer 9 will indicate the temperature of the solution. The solution to be tested being preferably of an anti-freeze solution, such as is used in the radiators of motor driven vehicles. Due to the variant specific gravity caused by the change in temperature of the tested solution, it is necessary in a number of cases that an instrument be constructed which will indicate not only the hydrometer or specific gravity reading, but also the temperature of the tested solution and at the same time furnish a correction table whereby the freezing point of the particular solution to be tested may be determined.

The use of the device is thought apparent from the foregoing, and may herein be briefly described as follows: The device is placed in the solution to be tested, in a manner well known in the art, until for example the liquid level is indicated at D D, on scale 6 and the temperature of the solution will be indicated by the mercury column as being, for example, ninety degrees. The freezing point of the solution is then obtained by consulting the horizontal row of figures that is disposed in a horizontal plane with the numeral 90 of the vertical column 16, and that number appearing in said horizontal row, and appearing under "D", which in this instance will be plus 9 indicates the freezing point of the particular solution tested.

By reason of the fact that the hydrometer is maintained in a vertical position during the test the corrected reading may be more accurately and more quickly determined than is possible where the thermometer must be turned into a horizontal position for reading the correction table after ascertaining the hydrometer reading.

In practice, it will be apparent that the Fahrenheit figures of the thermometer scale may be dispensed with, if desired, as the mercury column in the thermometer will itself indicate the division of the scale in which the corrections will be made.

It is obvious that my invention is susceptible to various changes and modifications in construction without departing from the spirit of the invention or the scope of the appended claims, and I accordingly claim all such forms of the device to which I am entitled.

Having thus described my invention, what I claim as new is:

1. A hydrometer comprising in combination, a float having a hydrometer scale positioned in its upper portion, a thermometer arranged in the lower portion of the float and a correction table associated with the thermometer comprising a flexible sheet of material placed in rolled form within the float and having its outer surface ruled into vertical and horizontal columns, each of said horizontal columns having a scale identical with the hydrometer scale and each of said horizontal columns also having a correction scale on a horizontal plane with a corresponding temperature reading of the scale of the above mentioned thermometer for indicating the corrected freezing point of the tested solution in accordance with the indicated hydrometer and thermometer reading.

2. A hydrometer comprising in combination, a float having a hydrometer scale positioned in its upper portion, a thermometer arranged in the lower portion of the float and a correction table associated with the thermometer, said table being composed of a series of intersecting ruled lines forming vertical and horizontal columns, each of said horizontal columns having a scale identical with the hydrometer scale and each of said horizontal columns also having a correction scale on a horizontal plane with a corresponding temperature reading of the scale of the above mentioned thermometer for indicating the freezing point of the tested solution in accordance with the indicated hydrometer and thermometer reading.

3. A hydrometer including a float having a hydrometer scale positioned in its upper portion, a thermometer arranged in the lower portion of the float, a correction table carried by said float in the lower portion thereof, said table being composed of a series of intersecting ruled lines forming vertical and horizontal columns, one of said vertical columns having a thermometer scale adapted to be read against the thermometer, each of said horizontal columns having a scale identical with the hydrometer scale, and each of said horizontal columns also having a correction scale on a horizontal plane with a corresponding temperature reading of the scale of the above mentioned thermometer for indicating the freezing point of the tested solution in accordance with the indicated hydrometer and thermometer reading.

In testimony whereof I affix my signature.

MAX A. MYERS.